Figure 1:
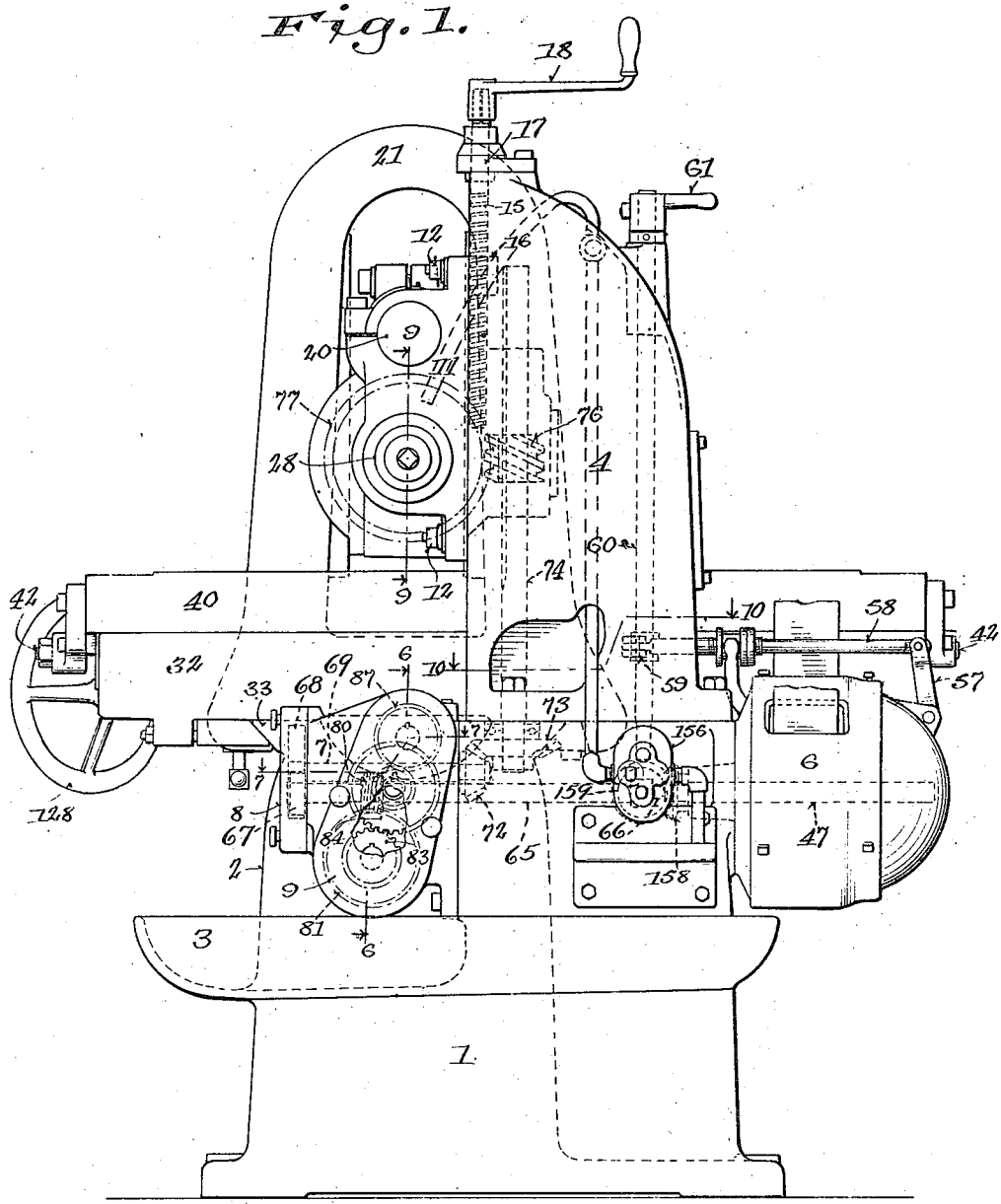

F. A. PARSONS.
TRANSMISSION AND CONTROL MECHANISM FOR MACHINE TOOLS.
APPLICATION FILED APR. 1, 1919.

1,322,939.

Patented Nov. 25, 1919.

8 SHEETS—SHEET 1.

Inventor:
Fred A. Parsons,
By Bottum Bottum Hadnell & Leedes
Attorneys.

F. A. PARSONS.
TRANSMISSION AND CONTROL MECHANISM FOR MACHINE TOOLS.
APPLICATION FILED APR. 1, 1919.

1,322,939.

Patented Nov. 25, 1919.
8 SHEETS—SHEET 2.

Fig. 2.

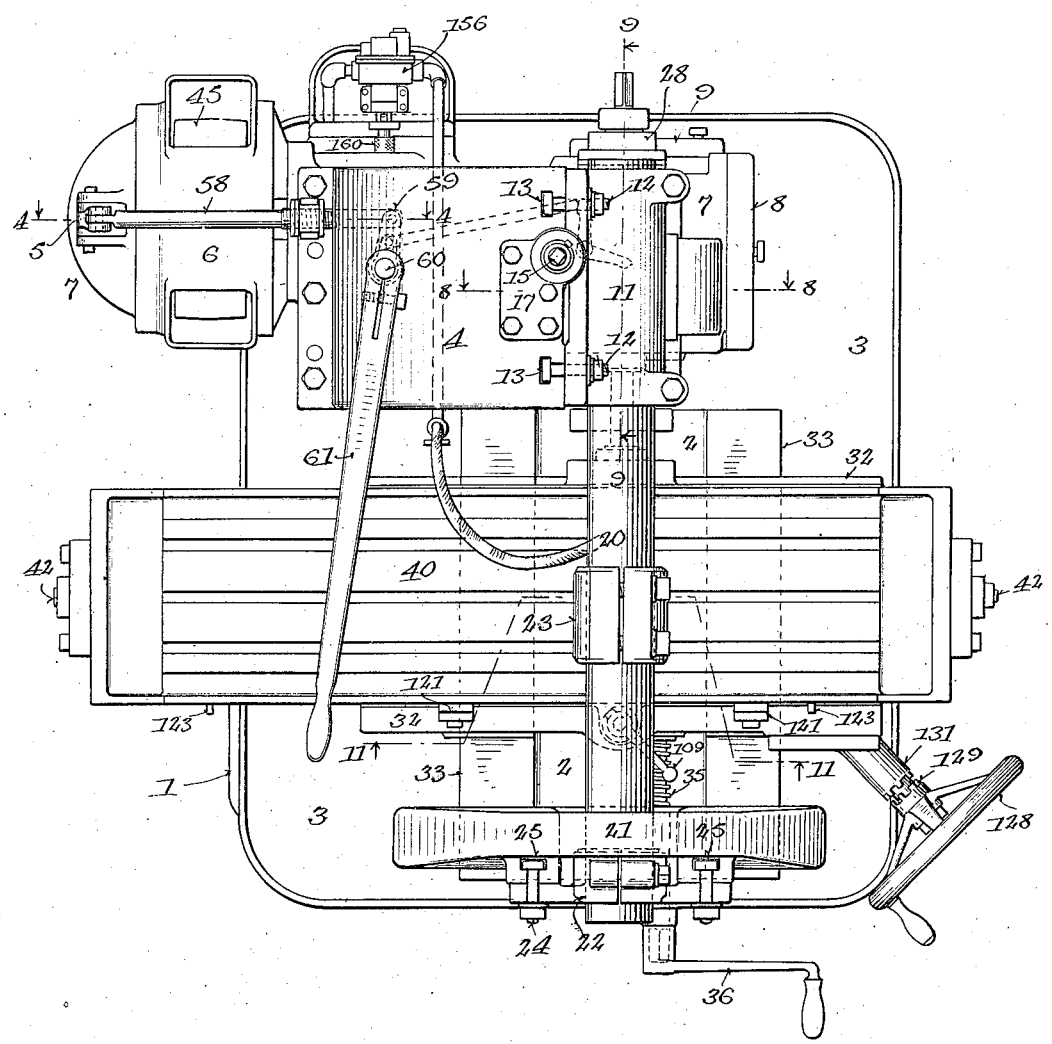

F. A. PARSONS.
TRANSMISSION AND CONTROL MECHANISM FOR MACHINE TOOLS.
APPLICATION FILED APR. 1, 1919.
1,322,939.
Patented Nov. 25, 1919.
8 SHEETS—SHEET 4.
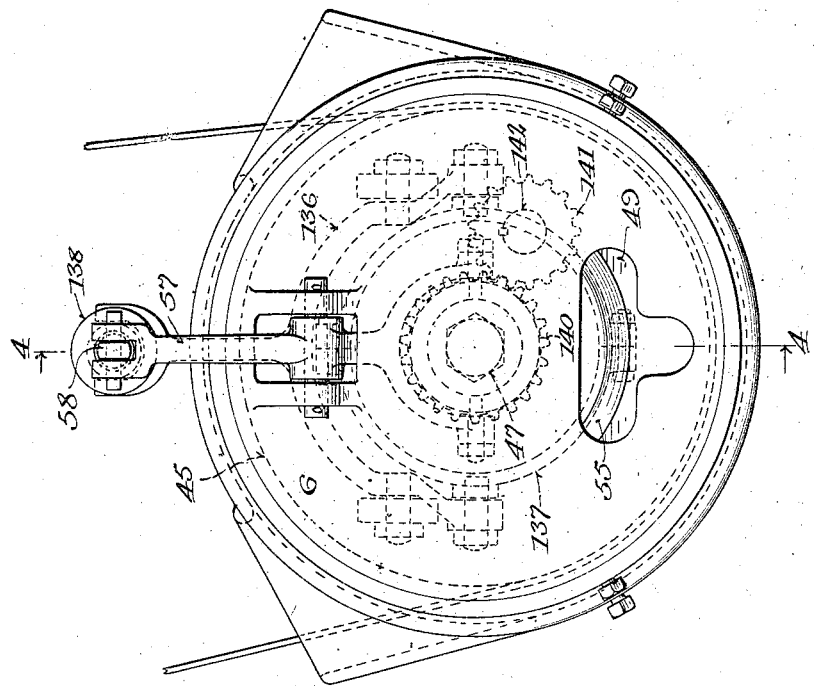
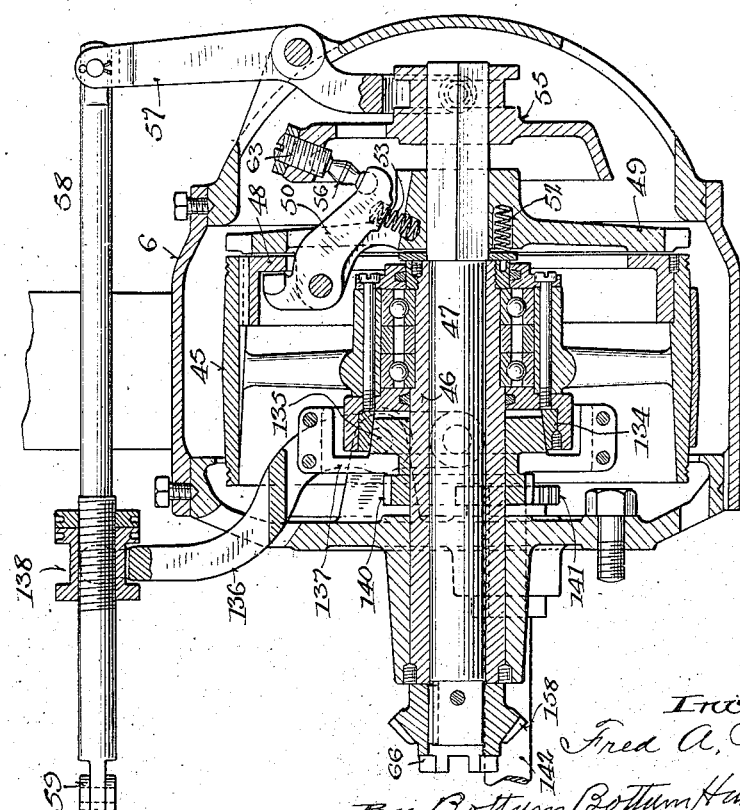
Inventor:
Fred A. Parsons,
By Bottum Bottum Hudnall & Lecher
Attorneys.

Inventor:
Fred A. Parsons,
By Bottum Bottum Hadnall & Lecher
Attorneys.

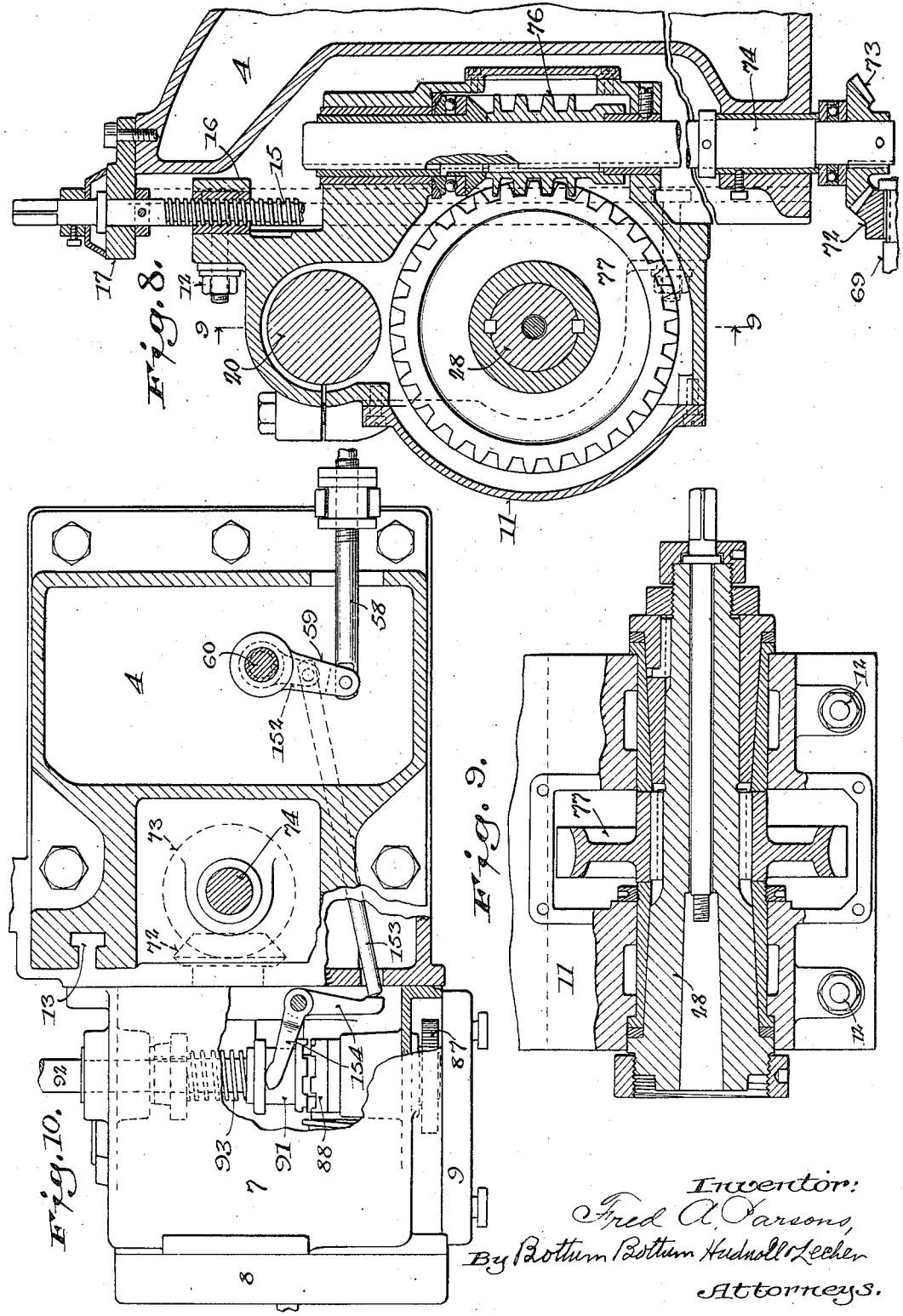

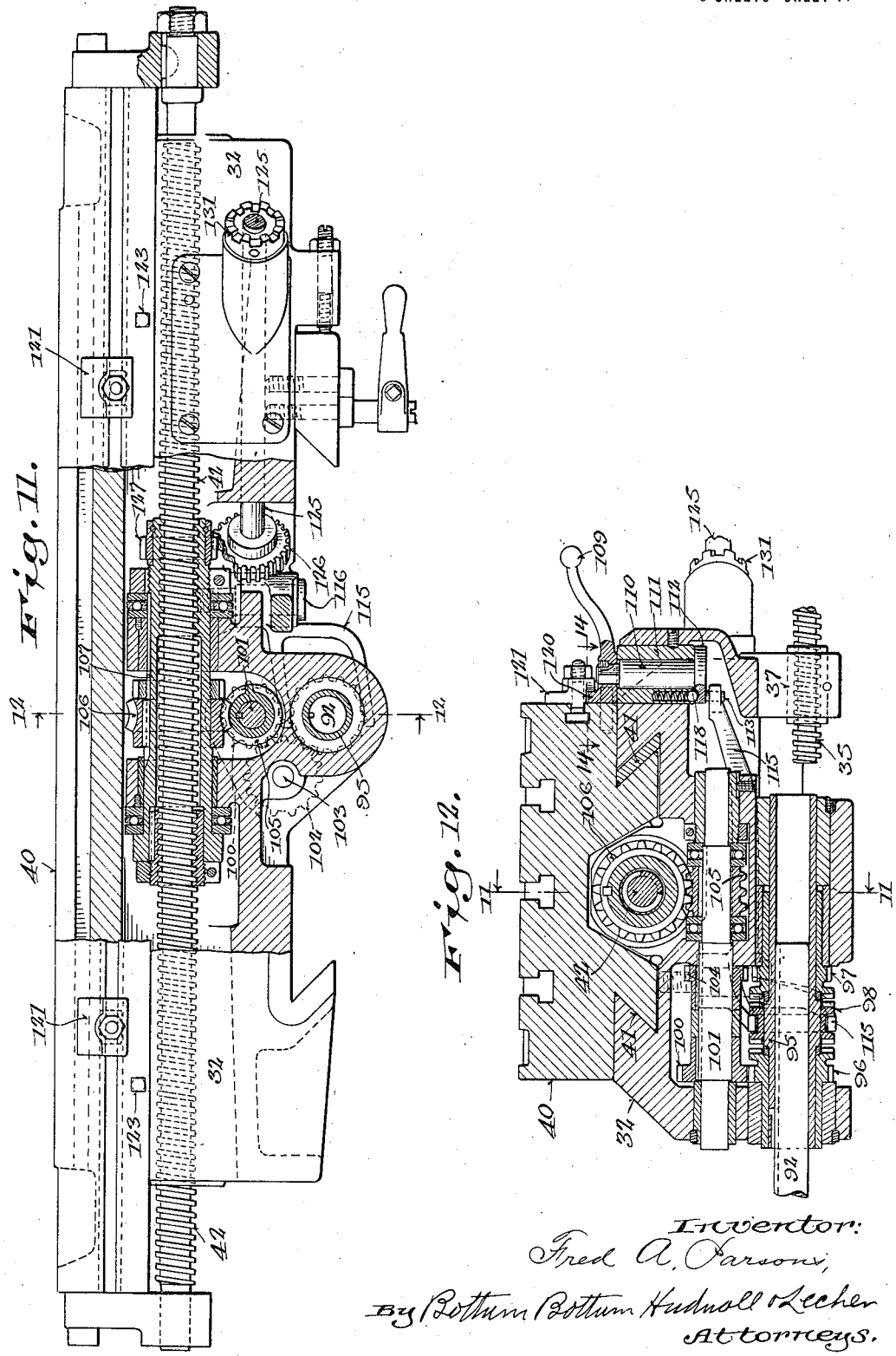

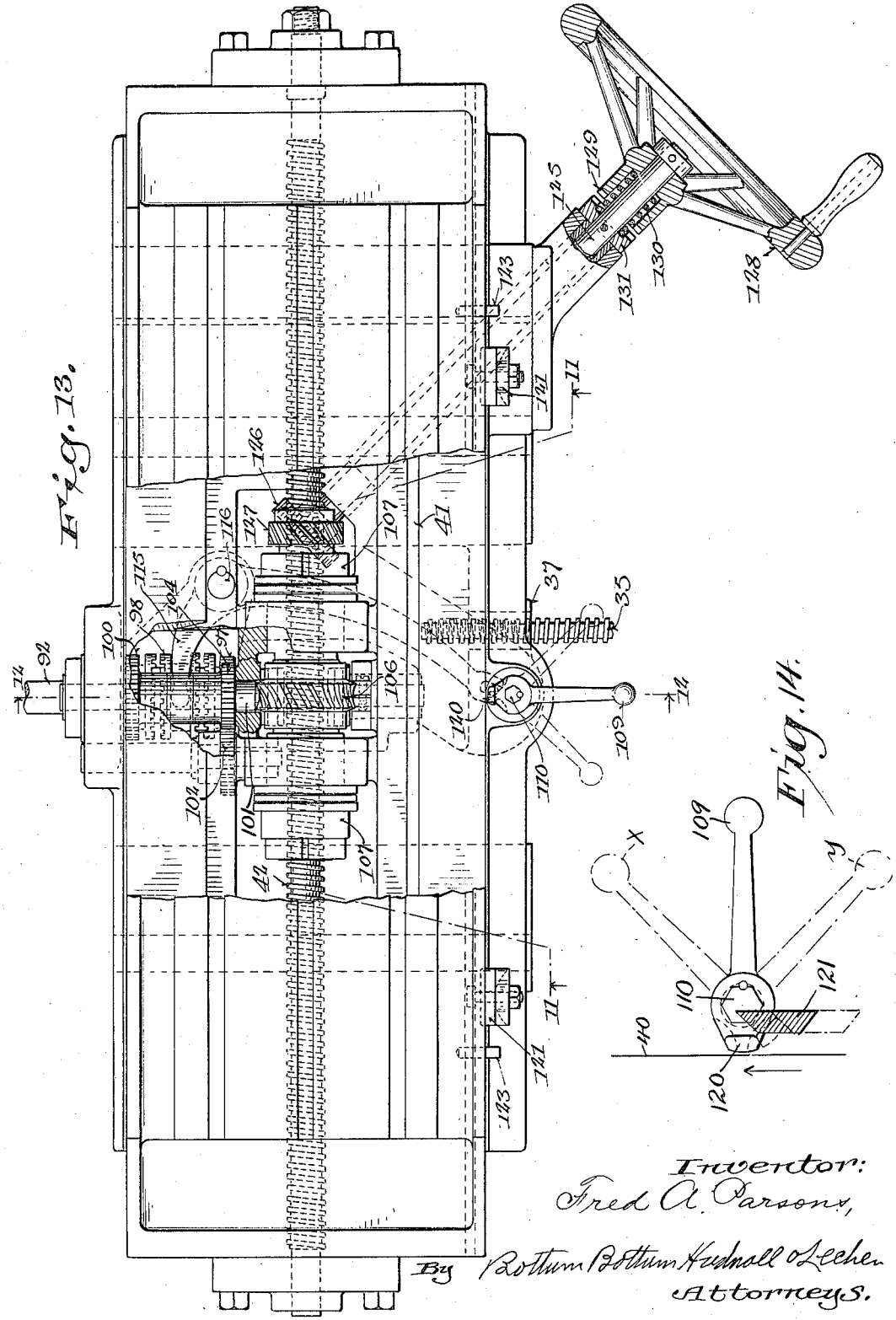

UNITED STATES PATENT OFFICE.

FRED A. PARSONS, OF MILWAUKEE, WISCONSIN, ASSIGNOR TO THE KEMPSMITH MANUFACTURING CO., OF WEST ALLIS, WISCONSIN, A CORPORATION OF WISCONSIN.

TRANSMISSION AND CONTROL MECHANISM FOR MACHINE-TOOLS.

1,322,939. Specification of Letters Patent. Patented Nov. 25, 1919.

Application filed April 1, 1919. Serial No. 286,659.

*To all whom it may concern:*

Be it known that I, FRED A. PARSONS, a citizen of the United States, residing at Milwaukee, in the county of Milwaukee and State of Wisconsin, have invented certain new and useful Improvements in Transmission and Control Mechanism for Machine-Tools, of which the following is a specification, reference being had to the accompanying drawing, forming a part thereof.

The main objects of the invention are to provide a machine tool with improved means for operating the table or work support at either a variable feed rate or a constant quick traverse rate in such a manner as to secure operating convenience; to so combine such feed and quick traverse means with elements for driving the tool, that the quick traverse rate is always available while a feed rate is available only when the tool is being driven; an organization of the transmission mechanism in which the quick traverse elements run at a quick traverse rate only when they are used to actuate the table or work support at that rate whereby unnecessary wear is avoided and the life of the mechanism is prolonged; to provide simple, convenient and effective means for both manual and automatic interruption of the operation of the table or work support either at a feed or the quick traverse rate; to combine with such interrupting means, simplified reversing mechanism for both feed and quick traverse operation of the table or work support; to simplify and improve the construction and operation of the devices for controlling the power movements of the table or work support; to reduce the number of parts for controlling all operating movements of both the tool and the table or work support, thereby simplifying the movements of the operator, increasing his efficiency in running the machine, and enabling a new operator to sooner become proficient in the operation of the machine; and generally to simplify and improve the construction and operation of machines of this class.

It consists in the construction and organization of parts to attain the foregoing objects as hereinafter particularly described and pointed out in the claims.

In the accompanying drawing like characters designate the same parts in the several figures.

Figure 6:
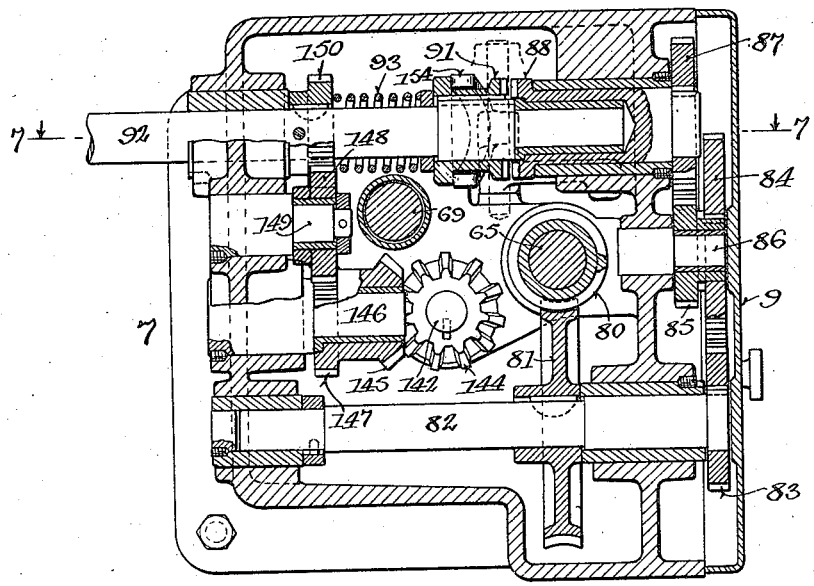
Figure 7:
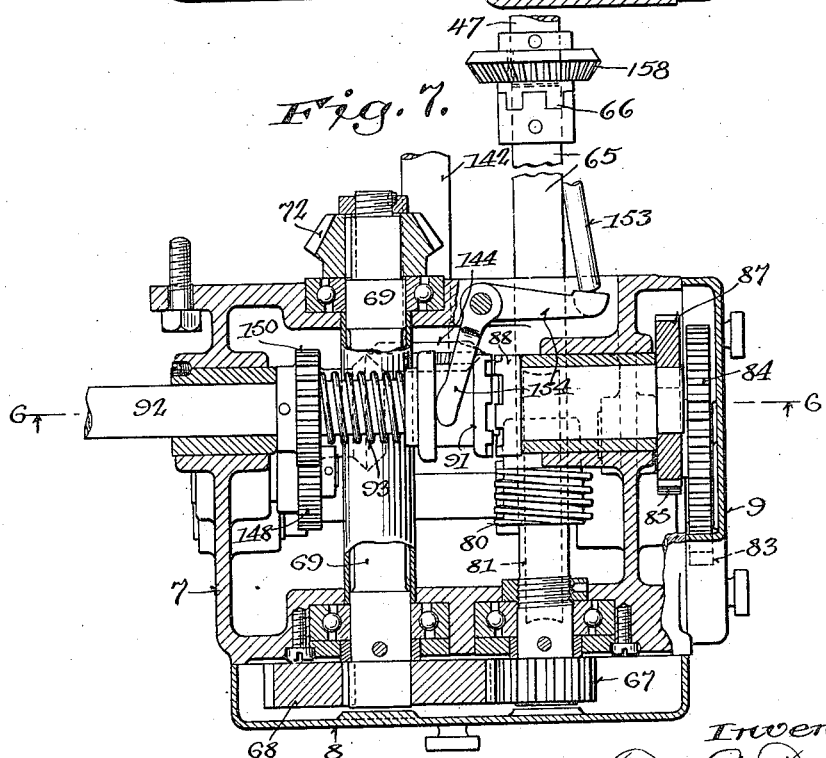

Figure 1 is a general rear elevation of a plain milling machine embodying the invention; Fig. 2 is a general side elevation of the machine as viewed from the left relative to Fig. 1; Fig. 3 is a plan view of the machine; Fig. 4 is an enlarged vertical, longitudinal section on the line 4—4, Figs. 3 and 5, of the driving pulley and clutch unit; Fig. 5 is an end elevation as seen from the right relative to Fig. 4, of said unit; Fig. 6 is an enlarged section generally on the line 6—6, Figs. 1 and 7, of the gear box unit comprising parts of the spindle, table feed, and table quick traverse transmissions; Fig. 7 is a similarly enlarged section of said gear unit generally in planes indicated by the line 7—7, Figs. 1 and 6; Fig. 8 is an enlarged vertical section of the headstock or spindle unit on the line 8—8, Figs. 2 and 3, cutting the overarm and tool spindle transversely; Fig. 9 is a section on the line 9—9, Figs. 1, 3 and 8; Fig. 10 is an enlarged horizontal section on the line 10—10, Figs. 1 and 2; Fig. 11 is an enlarged view partly in front elevation and partly in vertical longitudinal section, on the line 11—11, Figs. 3, 12 and 13, of the saddle and table unit; Fig. 12 is a vertical cross section of said unit on the line 12—12, Figs. 11 and 13; Fig. 13 is an enlarged plan view of said saddle and table unit, parts being broken away; and Fig. 14 is an enlarged fragmentary horizontal section on the line 14—14, Fig. 12, illustrating the operation of the table controlling devices.

Referring to the general views, Figs. 1, 2 and 3, the frame of the machine comprises a hollow base 1, which may be cast as shown, with a bed 2 and with an outwardly projecting oil pan 3 below the bed, and a hollow column 4, which may be cast separately and bolted to the base as shown.

A pulley and clutch housing 6, is adjustably and removably mounted on one side of the base 1, and a gear box or case 7, is bolted to the opposite side of the base and is provided with removable covers 8 and 9.

A vertically adjustable headstock and spindle housing 11, is mounted on one side of the column 4 above the gear box 7, and is guided and secured in place on the column by bolts 12, engaging vertical T-grooves 13 in the column. The headstock is adjusted vertically on the column by means of a screw 15, engaging a nut 16 on the headstock and journaled in a bearing 17, fixed to the upper end of the column, the upper end of the screw being provided with a removable crank handle 18 for turning it.

An overarm 20, rigidly fastened at one end in the headstock 11, is supported at the opposite end by an outboard harness brace 21, removably mounted on the bed 2, and is provided with pendent arbor supports 22 and 23, the support 22 being guided on the brace 21 and secured in adjusted position thereon by bolts 24, engaging vertical T-grooves 25 in the brace. A rotary tool spindle 28, is mounted in and vertically adjustable with the headstock 11, below and parallel with the overarm 20, and a rotary tool supporting arbor 29 is detachably connected with the spindle 28 and supported and held in alinement therewith and parallel with the overarm by the pendent supports 22 and 23.

A saddle 32, is mounted and movable horizontally toward and from the column 4 on ways 33, formed or provided therefor on the bed 2, parallel with the overarm 20.

A screw 35, having a fixed bearing in the front end of the bed 2 and provided with a removable crank handle 36, engages a nut 37 (see Fig. 12) on the under side of the saddle, and serves as means for manually effecting the cross traverse of the saddle with the work supporting table on the ways 33.

A work supporting table 40, mounted and movable horizontally in parallel ways 41 in the saddle 32 transversely to arbor 29 and to the ways 33, is provided with a nonrotatable translating screw 42 (see Figs. 11 and 13), parallel with the ways 41 and supported and fastened at its ends to the under side of the table.

The working parts of the machine are grouped in separate units, which can be readily removed from the machine independently of one another, to facilitate inspection and repairs.

Referring to Figs. 4 and 5, illustrating in connection with Figs. 1, 2 and 3, the driving pulley and clutch unit, a main driving pulley or member 45 is loosely and rotatably mounted on a sleeve bearing 46 in the housing 6, and may be operatively connected at will with a shaft 47, passing through and journaled in the bearing 46 by a clutch comprising an inwardly projecting flange 48 attached to the rim of the pulley, a friction plate 49, mounted on and shiftable lengthwise of a polygonal end portion of the shaft into and out of engagement with the pulley flange 48, and provided with levers 50 engageable with the opposite side of the pulley flange. Springs 52, interposed between the hub of the plate 49 and the hub of the pulley 45, tend to shift and hold said plate out of engagement with the pulley flange 48, and springs 53 interposed between the inner ends of the levers 50 and the hub of the plate 49, tend to shift and hold the outer ends of said levers away from the plate 49 and the intervening pulley flange 48. The clutch is engaged and disengaged to operatively connect and disconnect the pulley 45 and shaft 47 by means of the following shifting mechanism:

A grooved spool or fork collar 55, loosely fitted on and shiftable lengthwise of the polygonal end of the shaft 47, is connected by toggle links 56, with the inner ends of the levers 50. A forked lever 57, engaging the spool or collar 55 and fulcrumed in the housing 6, is connected by a rod 58 with an arm 59 on a vertical shaft 60, extending upwardly through the column 4 and provided at its upper end with a hand lever 61, as shown in Figs. 1, 3, 4 and 10. The toggle links 56 have ball and socket joint connections with the levers 50 and spool or collar 55, and to take up wear of and adjust the movable clutch members 49 and 50. The sockets 63 are threaded and adjustable in the spool or collar 55 and are secured in adjusted position therein by lock nuts, as shown in Fig. 4.

*Spindle transmission.*

Referring to Figs. 4, 6, 7 and 8, in connection with Fig. 1, a shaft 65, journaled in the gear box 7, is detachably connected at one end by coupling members 66 with the shaft 47 of the driving pulley and clutch unit, and is provided at the opposite end as shown in Fig. 7, with a removable change-speed gear 67. The gear 67 meshes with another change-speed gear 68, mounted on a parallel shaft 69, journaled in the gear box 7. By substituting for the gears 67 and 68, which are easily accessible by removing the cover 8, other gears of different sizes, the speed of the tool spindle 28 may be varied as desired.

On the end of the shaft 69 opposite the gear 68, is mounted a bevel gear 72, meshing as shown in Figs. 1 and 8, with a similar bevel gear 73 on the lower end of a vertical shaft 74, journaled in and extending upwardly into the column 4. A worm 76, splined or feathered on the shaft 74, and confined by bearings in the headstock 11, is movable therewith lengthwise of said shaft and meshes with a worm gear 77, fixed on the spindle 28, as shown in Figs. 8 and 9.

The spindle 28, worm 76 and worm gear 77, with the headstock 11 in which they are housed, constitute the spindle unit, which is adjustable vertically by the screw 15 and crank handle 18.

Table feed transmission.

A worm 80, fixed on the shaft 65, meshes with a worm gear 81, mounted on a transverse shaft 82, journaled below it in the gear box 7. On one end of the shaft 82 is removably mounted a change-speed gear 83, meshing with a gear 84, which is removably mounted with a coaxial gear 85 on a stud 86. The gear 85 meshes with a gear 87 connected with a coaxial clutch member 88, journaled in the gear box 7 parallel with the shaft 82. The change-speed gears 83, 84, 85 and 87 are readily accessible by removing the cover 9 of the gear box and by substituting therefor gears of different sizes, the speed of the clutch member 88 and the feed of the table 40 when operatively connected therewith as hereinafter explained, may be varied as desired.

A clutch member 91, feathered and slidably mounted on a shaft 92 in axial alinement with the clutch member 88, is normally held by a spring 93 in engagement therewith.

The shaft 92, which has bearings in the clutch member 88 and gear box 7 as shown in Figs. 6 and 7, extends from the gear box parallel with the spindle 28 and arbor 29 underneath the saddle 32, as shown in Figs. 2, 11, 12 and 13, and is slidably feathered in a sleeve 95 having bearings in the saddle. On the sleeve 95 are loosely mounted two gears, 96 and 97, and between these gears a clutch collar or member 98 is feathered and shiftable into engagement with a corresponding clutch member formed on or attached to the adjacent side of each gear, or into an intermediate position, as shown in Fig. 12, out of engagement with the clutch members of both gears. The gear 96 meshes directly with a gear 100, fixed on a shaft 101, mounted in the saddle above and parallel with the shaft 92. The gear 97 meshes with a reversing gear 102, mounted on a stud 103, which is fixed in the saddle parallel with the shafts 92 and 101, and meshing with a gear 104 fixed on the shaft 101. The shaft 101 is provided with a worm 105, meshing with a worm gear 106, which is fixed on a sleeve nut 107, mounted in bearings in the saddle in alinement and engagement with the screw 42. The sleeve nut 107 is made in sections axially adjustable one relative to the other for taking up wear and lost motion between the nut and screw.

The clutch member 98 may be shifted manually into and out of engagement with either gear 96 or 97, for feeding the table 40 in either direction or into its middle or neutral position, for arresting the movement of the table, or it may be shifted automatically out of engagement with either gear into its middle or neutral position, to arrest the movement of the table in either direction, by the following means:

A hand lever 109 is fastened to the upper end of a vertical pivot stem 110, which is mounted in a removable bushing 111 in the front side of the saddle 32 within convenient reach of the operator. The lower end of the stem 110 is formed or provided with a head or flange 112, which has a crank pin 113. A lever 115, fulcrumed on a vertical pin 116 in the saddle, has forked ends, one of which engages with the clutch member 98, and the other with the crank pin 113.

When the lever 109 is in its middle position as shown by the full lines in Fig. 13, the clutch member 98 is in its middle or neutral position, and operative connection between the table 40 and the transmission shaft 92, is broken. By turning the lever 109 to the right, as indicated by dotted lines in Fig. 13, the clutch member 98 is shifted into engagement with the gear 96 for feeding the table 40 forward or to the right. On the other hand, by turning said lever to the left, as also indicated by dotted lines in Fig. 13, the clutch member 98 is shifted into engagement with the gear 97 for operatively connecting the transmission shaft 92 through the reverse gear 102, with the worm shaft 101, and driving the table in a reverse direction, or to the left. The direction of movement of the hand lever 109 thus corresponds with the direction of the resulting movement of the table, and clearly indicates to the operator the direction in which the lever should be turned to produce movement of the table in the desired direction.

A spring actuated ball or detent 118, held in a socket in the bushing 111 by engagement with spaced seats in the head or flange 112, yieldingly holds the lever 109 in either of its extreme positions indicated by dotted lines in Figs. 13 and 14, or in its middle or neutral position, in which it is shown by full lines in the same figures.

The lever 109 is formed or provided with an upwardly projecting lug 120, close to the front side of the table 40, and the table is provided with one or more removable dogs 121, fastened to the table by bolts engaging a longitudinal T-groove in its front side and adjustable with the dogs lengthwise of the table. These dogs are formed with downwardly projecting flanges having beveled ends as shown in Figs. 12, 13 and 14, adapted by engagement with the lug 120 when the table is moved in either direction, to turn the lever 109 into and leave it in its middle or neutral position, thereby arresting further movement of the table in the same direction, but permitting its further movement in that direction by hand, since either dog can pass and clear the lug in its middle position, and permitting the lever to be turned to operate the table in the opposite direction by power. For example, assuming that the lever 109 is turned to the right into the position indicated by dotted lines $x$, Fig. 14, and the table is being driven by power in that direction, as indicated by an arrow, when the left hand dog 121 is brought into engagement with the lug 120, it will turn the lever into its middle or neutral position, thereby stopping the table. Obviously, when the lever 109 is thus left in its middle position, the dog can pass the lug 120 and the table can be moved farther to the right by manual operation of the crank or wheel 128, or the lever can be turned to the left into the position indicated by dotted line $y$ for propelling the table in the opposite direction by power, but said lever cannot be shifted back to position $x$ while the dog remains in the position in which it is shown by full lines for driving the table farther forward or to the right by power.

The table 40 is also provided on the front side with fixed pins or projections 123, which by engagement with cam surfaces on the hub of lever 109 below the lug 120, as indicated by dotted lines in Figs. 13 and 14, will automatically shift the lever 109 from either of its extreme positions into its middle or neutral position, thereby shifting the clutch member 98 out of engagement with either gear 96 or 97, stopping the table as it reaches the limit of its traverse in either direction, and preventing further movement in the same direction and consequent injury to the machine.

A shaft 125, mounted in the saddle obliquely to the screw 42, is provided at its inner end with a spur gear 126, meshing with a spiral gear 127, fixed on the sleeve nut 107. At its outer end, conveniently accessible to the operator, the shaft 125 is provided with a crank or hand wheel 128, loosely mounted thereon and having a clutch 129 on its hub which is normally held by a spring 130 out of engagement with a corresponding clutch member 131, fixed on the shaft.

When the clutch member 98 is in its middle or neutral position, so that the gears 96 and 97 can turn freely on the shaft 92, the operator can manually operate the table by thrusting the hand wheel 128 inward till the clutch member 129 engages the clutch member 131, and then turning the hand wheel in the proper direction to effect the desired table movement. In this way the table can be moved by hand in either direction after it has been stopped by the engagement of a dog 121 with the lug 120, and while the lever 109 can be turned into position to effect a reverse movement, it cannot be turned into position to effect further movement in the same direction by power.

With the mechanism hereinbefore described, it will be seen that the table may be moved in either direction by power at a variable feed rate, or by hand, and that it will be automatically stopped at the limits of its traverse or at any predetermined intermediate point or points of its traverse, or its movement may be reversed or arrested by hand at any point in its traverse.

*Table quick traverse transmission.*

Referring to Figs. 4 and 5, the driving pulley 45 is provided on the opposite side from the clutch plate 49, with a conical friction clutch member 134, and a corresponding clutch member 135, loosely mounted on the sleeve bearing 46, is shiftable thereon into and out of engagement with the member 134. The member 135 is shifted by means of a forked lever 136, fulcrumed to and within the housing 6, and pivotally connected with opposite sides of a split ring 137, loosely embracing said member and engaging a circumferential groove therein. The outer forked end of the lever 136, which projects through an opening in the upper part of the housing 6, engages a spool or grooved collar 138, adjustably mounted on the rod 58. The quick traverse clutch is thus connected with and operated by the same hand lever 61, which operates the spindle transmission and table feed transmission controlling clutch on the opposite side of the driving pulley, as shown in Figs. 1 and 3.

When the hand lever 61, which as shown in Figs. 2 and 3, is always within easy reach of the operator at the front of the machine, is swung to the right, the clutch 49 controlling the spindle and table feed transmissions, is engaged with the driving pulley, and the clutch 135 which controls the table quick traverse transmission, is disengaged from the driving pulley. The spool or collar 138 is so adjusted on the rod 58 that in the middle or an intermediate position of the lever 61, both clutches will be disengaged, the adjustment of said spool or collar determining the time of engagement and disengagement of one clutch relative to the time of disengagement and engagement of the other clutch, and the rod 58 which connects the two levers 57 and 136, preventing simultaneous engagement of both clutches.

As shown in Figs. 4, 6 and 7, the clutch member 135 is formed or provided with a gear 140, meshing with a gear 141, and a shaft 142, separably engaged with the gear 141 and passing through the column 4 into the gear box 7 in which it has a bearing, is provided in the gear box with a bevel gear 144, meshing with a similar gear 145, mounted on a stud 146 in the gear box. The gear 145 is formed with or attached to a coaxial spur gear 147, which meshes with a gear 148 mounted on a stud 149 and meshing with a gear 150 fixed on the shaft 92.

The shaft 92 thus serves as a transmission connection between the gear box 7 and the table 40, common to both the feed and quick traverse transmissions.

Although the feed transmission is disconnected from the driving pulley 45 by disengagement of the clutch 49, when the quick traverse transmission is operatively connected with the pulley by engagement of the clutch 135, it is necessary or desirable whenever the table is operatively connected with the driving pulley through the quick traverse transmission, to disconnect the feed transmission from the quick traverse transmission at or near its junction therewith. To this end, the shaft 60 is extended below the arm 59, as indicated in Fig. 1, and is provided at its lower end as shown in Fig. 10, with an arm 152. The arm 152 is connected with a rod 153, extending therefrom into the gear box 7, and adapted by engagement with an arm of a forked clutch shifting lever 154, to shift the clutch member 91 against the tension of spring 93 out of engagement with the clutch member 88, whenever the quick traverse clutch 135 is engaged with and the feed clutch 49 is disengaged from the driving pulley 45, as hereinbefore described. The shaft 92 is thus prevented whenever it is operatively connected by the clutch 135 with the driving pulley through the quick traverse transmission, from actuating the feed transmission, including its change-speed gears at the quick traverse rate, if this were possible, and from subjecting it to unnecessary wear.

*Pump transmission.*

Referring to Figs. 1, 2 and 3, the machine is provided on one side of the base with a rotary pump 156, for supplying a cooling liquid when the nature of the work requires it, from a reservoir in the base to the cutter or cutters on the arbor 29. The main spindle and feed transmission shaft 47 is provided as shown in Fig. 4 with a bevel gear 158, which meshes as indicated by dotted lines in Figs. 1 and 2 with a similar gear 159 on a short shaft extending at right angles to the shaft 47 through the wall of the base and connected by a clutch 160 with the pump shaft. The pump being thus connected with the spindle and feed transmission shafts, is operative only when the spindle and feed transmissions are connected by the clutch 49 with the driving pulley 45, and hence is not operative when the quick traverse transmission is connected with the driving pulley by the clutch 135. By disengaging the clutch 160, the pump, when the nature of the work does not require its operation, may be disconnected from the shaft 47.

Various changes in the construction and arrangement of parts of the mechanism may be made without departure from the principle and scope of the invention as defined in the following claims.

I claim:

1. In a machine tool the combination of movable work and tool supports, a driving member, transmission connections between the respective supports and the driving member, clutches for operatively connecting the respective transmission connections with the driving member, and a shifting device operatively connected with both clutches.

2. In a machine tool the combination of movable work and tool supports, a common driving member, transmission mechanism connected with each support, clutches for operatively connecting the transmissions of the respective supports with the driving member, a shifting device common to both clutches, and means for preventing simultaneous engagement of both clutches.

3. In a machine tool the combination of movable work and tool supports, a common driving member, transmission mechanism for each support, clutches for operatively connecting the transmissions of the respective supports with the driving member, a shifting device common to both clutches, and means for varying the time of engagement of one clutch relative to the other.

4. In a machine tool the combination of a rotary tool spindle, a reciprocable work table, a rotary driving member, transmissions for the tool spindle and work table, clutches for operatively connecting the transmissions of the tool spindle and work table respectively with the common driving member, and a hand lever connected with both clutches and adapted to shift either clutch into or out of engagement.

5. In a machine tool the combination of movable tool and work supports, a rotary driving member, transmissions for said supports, and shiftable clutches adjacent opposite sides of the driving member for operatively connecting it with the transmissions of the tool and work supports respectively.

6. In a machine tool the combination of movable tool and work supports, a rotary driving member, transmissions for said supports, clutches on opposite sides of the driving member, for operatively connecting it with the transmissions of the tool and work supports respectively, and levers for shifting the clutches into and out of engagement.

7. In a machine tool the combination of movable tool and work supports, a rotary driving member, transmissions for said supports, clutches on opposite sides of the driving member for operatively connecting it with the transmissions of the tool and work supports respectively, and means common to both clutches for shifting them into and out of engagement.

8. In a machine tool the combination of movable tool and work supports, a rotary driving member, transmissions for said supports, clutches on opposite sides of the driving member for operatively connecting it with the transmissions of the tool and work supports respectively, and shifting means common to both clutches and adjustable to vary the time of engagement of one clutch relative to the other.

9. In a machine tool the combination of movable tool and work supports, a rotary driving member, transmissions for said supports, clutches on opposite sides of the driving member for operatively connecting it with the transmissions of the tool and work supports respectively, and means for shifting the clutches comprising means to prevent simultaneous engagement of both clutches.

10. In a machine tool the combination of movable tool and work supports, a rotary driving member, a constant speed transmission for one of said supports, a variable speed transmission comprising change-speed elements for the other support, clutches on opposite sides of the driving member for operatively connecting it with said transmissions, and means for shifting either of the clutches into and out of engagement.

11. In a machine tool the combination of a rotary tool spindle, a reciprocable work table, a rotary driving member, transmissions for the tool spindle and work table, clutches on opposite sides of the driving member for operatively connecting it with said transmissions, and a hand lever connected with both clutches and adapted to shift either clutch into and out of engagement.

12. In a machine tool the combination of movable tool and work supports, a rotary driving member, a clutch adjacent one side of the driving member, transmission connections from said clutch to both supports, a second clutch adjacent the other side of the driving member, and a third transmission connection from the second clutch to one of the supports.

13. In a machine tool the combination of movable tool and work supports, a rotary driving member, a clutch adjacent one side of the driving member, transmission connections from said clutch to both supports, a second clutch adjacent the other side of the driving member, a third transmission connection from the second clutch to one of the supports, and a shifting device common to both clutches.

14. In a machine tool the combination of movable tool and work supports, a rotary driving member, a clutch adjacent one side of the driving member, transmission connections from said clutch to both supports, a second clutch adjacent the other side of the driving member, a third transmission connection from the second clutch to one of the supports, and means for shifting either clutch into and out of engagement and for preventing simultaneous engagement of both clutches.

15. In a machine tool the combination of movable tool and work supports, a rotary driving member, a clutch adjacent one side of the driving member, transmission connections from said clutch to both supports, a second clutch adjacent the other side of the driving member, and a third transmission from the second clutch to one of the supports, one of the transmission connections being of constant speed and one of the other transmission connections comprising change-speed elements.

16. In a machine tool the combination of movable tool and work supports, a rotary driving member, a clutch adjacent one side of the driving member, transmission connections from said clutch to both supports, a second clutch adjacent the other side of the driving member, a third transmission connection from the second clutch to one of the supports, and shifting means common to both clutches and adjustable to vary the time of engagement of one clutch relative to the time of disengagement of the other clutch.

17. In a machine tool the combination of a rotary tool spindle, a reciprocable work table, a rotary driving member, spindle and table feed transmissions, a clutch adjacent one side of the driving member for operatively connecting said transmissions therewith, a table quick traverse transmission, a clutch adjacent the other side of the driving member for operatively connecting the quick traverse transmission therewith, and a shifting lever common to both clutches.

18. In a machine tool the combination of a movable work table, a rotary driving member, feed and quick traverse transmissions for operating the table, clutches for operatively connecting said transmissions with the driving member, a third clutch for interrupting operative connecting with the table of one transmission when the other transmission is operatively connected with the driving member by one of the other clutches, and shifting means common to all the clutches.

19. In a machine tool the combination of a movable work table, a rotary driving member, feed and quick traverse transmissions for operating the table, clutches for operatively connecting said transmissions with the driving member, a third clutch adapted to interrupt operative connection with the table of one transmission when the other transmission is operatively connected with the driving member by one of the other clutches, and shifting means common to all the clutches and adjustable to vary the relative time of engagement and disengagement of the first mentioned clutches.

20. In a machine tool the combination of a movable work table, a rotary driving member, feed and quick traverse transmissions for operating the table, clutches for operatively connecting said transmissions with the driving member, a third clutch adapted to interrupt operative connection with the table of one transmission when the other transmission is operatively connected with the driving member by one of the other clutches, and shifting means common to all the clutches and adapted to prevent simultaneous engagement of the third clutch and the quick traverse clutch.

21. In a machine tool the combination of a movable work table, a rotary driving member, feed and quick traverse transmissions for operating the table, clutches for operatively connecting said transmissions with the driving member, a third clutch adapted to interrupt operative connection with the table of one transmission when the other transmission is operatively connected with the driving member by one of the other clutches, and shifting means common to all the clutches and adapted to prevent simultaneous engagement of the quick traverse clutch and either of the other clutches.

22. In a machine tool the combination of a movable work table, a rotary driving member, feed and quick traverse transmissions for operating the table, clutches for operatively connecting said transmissions with the driving member, a third clutch controlling operative connection of the feed transmission with the table, and clutch shifting means adapted to prevent simultaneous engagement of the quick traverse and feed clutches and to permit simultaneous engagement of the feed and third clutches.

23. In a machine tool the combination of a movable work table, a rotary driving member, a variable speed feed transmission and a constant speed quick traverse transmission for operating the table, clutches for operatively connecting said transmissions with the driving member, a third clutch controlling operative connection of the feed transmission with the table, and shifting means common to all the clutches.

24. In a machine tool the combination of a movable work table, a rotary driving member, feed and quick traverse transmissions for operating the table, clutches for operatively connecting said transmissions with the driving member, a third clutch controlling operative connection of the feed transmission with the table, motion reversing mechanism common to both transmissions, and shifting means common to all the clutches.

25. In a machine tool the combination of a movable work table, a rotary driving member, feed and quick traverse transmissions for operating the table, clutches for operatively connecting said transmissions with the driving member, a third clutch controlling operative connection of the feed transmission with the table, means common to both transmissions for interrupting operative connection thereof with the table, and shifting means common to all the clutches.

26. In a machine tool the combination of a movable work table, a rotary driving member, feed and quick traverse transmissions for operating the table, clutches for operatively connecting said transmissions with the driving member, a third clutch controlling operative connection of the feed transmission with the table, motion reversing and interrupting mechanism common to both transmissions, and shifting means common to all the clutches.

27. In a machine tool the combination of a movable work table, a rotary driving member, feed and quick traverse transmissions for operating the table, clutches for operatively connecting said transmissions with the driving member, a third clutch controlling operative connection of the feed transmission with the table, shifting means common to all the clutches, a shiftable motion interrupting device common to both transmissions, and a shiftable controlling device for operating the motion interrupting device.

28. In a machine tool the combination of a movable work table, a rotary driving member, feed and quick traverse transmissions for operating the table, clutches for operatively connecting said transmissions with the driving member, a third clutch controlling operative connection of the feed transmission with the table, shifting means common to all the clutches, a shiftable motion interrupting and reversing device common to both transmissions, and a shiftable controlling device for operating the motion interrupting and reversing device to either interrupt or reverse the movement of the table by either transmission.

29. In a machine tool the combination of a movable table, a rotary driving member, feed and quick traverse transmissions for operating the table, clutches for operatively connecting said transmissions with the driving member, a third clutch controlling operative connection of the feed transmission with the table, means tending to shift the third clutch into engagement, and shifting means adapted to disengage the third clutch when the quick traverse clutch is engaged.

30. In a machine tool the combination of a movable work table, a rotary tool spindle, a rotary driving member, a spindle transmission, a feed transmission for the table, a clutch common to said transmissions for simultaneously connecting them with the driving member, a quick traverse transmission for the table, a clutch for connecting the quick traverse transmission with the driving member, and shifting means common to both clutches.

31. In a machine tool the combination of a movable work table, a rotary tool spindle, a rotary driving member, a spindle transmission, a table feed transmission, a clutch for simultaneously connecting said transmissions with the driving member, a table quick traverse transmission, a clutch for connecting the quick traverse transmission with the driving member, shifting means common to both clutches, and means rendering one table transmission inoperative when the other is operative.

32. In a machine tool the combination of a movable work table, a rotary tool spindle, a rotary driving member, a spindle transmission, a table feed transmission, a clutch for connecting said transmissions with the driving member, a table quick traverse transmission, a clutch for connecting the quick traverse transmission with the driving member, and shifting means common to both clutches and comprising an adjustable element for varying the time of engagement of one clutch relative to the other.

33. In a machine tool the combination of a movable work table, a rotary tool spindle, a rotary driving member, a spindle transmission, a table feed transmission, a clutch for connecting said transmissions with the driving member, a table quick traverse transmission, a clutch for connecting said quick traverse transmission with the driving member, and clutch shifting means comprising means rendering the spindle and table feed transmissions inoperative when the table quick traverse transmission is operative.

34. In a machine tool the combination of a movable work table, a rotary tool spindle, a rotary driving member, a spindle transmission, a table feed transmission, a clutch for connecting said transmissions with the driving member, a table quick traverse transmission, a clutch for connecting the quick traverse transmission with the driving member, shifting means common to both clutches, and motion reversing mechanism common to both table transmissions.

35. In a machine tool the combination of a movable work table, a rotary tool spindle, a rotary driving member, a spindle transmission, a table feed transmission, a clutch for connecting said transmissions with the driving member, a table quick traverse transmission, a clutch for connecting the quick traverse transmission with the driving member, shifting means common to both clutches, and motion reversing and interrupting mechanism common to both table transmissions.

36. In a machine tool the combination of a movable work table, a rotary tool spindle, a rotary driving member, a spindle transmission, a table feed transmission, a clutch for connecting said transmissions with the driving member, a table quick traverse transmission, a clutch for connecting the quick traverse transmission with the driving member, shifting means common to both clutches, motion reversing mechanism common to both table transmissions, and comprising a shiftable member, and a controlling device for shifting said member.

37. In a machine tool the combination of a movable work table, a rotary tool spindle, a rotary driving member, a spindle transmission, a table feed transmission, a clutch for connecting said transmissions with the driving member, a table quick traverse transmission, a clutch for connecting the quick traverse transmission with the driving member, shifting means common to both clutches, a motion interrupting device common to both table transmissions and comprising a shiftable member, and a controlling device for shifting the motion interrupting member to stop the table.

38. In a machine tool the combination of a movable work table, a rotary tool spindle, a rotary driving member, a spindle transmission, a table feed transmission, a clutch for operatively connecting said transmissions with said driving member, a table quick traverse transmission, a clutch for connecting the quick traverse transmission with the driving member, a third clutch controlling operative connection of the feed transmission with the table, and shifting means common to all the clutches.

39. In a machine tool the combination of a movable work table, a rotary tool spindle, a rotary driving member, a spindle transmission, a table feed transmission, clutches for operatively connecting said transmissions with the driving member, a table quick traverse transmission, a clutch for connecting the quick traverse transmission with the driving member, a third clutch controlling operative connection of the feed transmission with the table, and shifting means common to all the clutches and comprising means to prevent simultaneous engagement of the quick traverse and third clutches.

40. In a machine tool the combination of a movable work table, a rotary tool spindle, a rotary driving member, a spindle transmission, a table feed transmission, a clutch for operatively connecting said transmissions with the driving member, a table quick traverse transmission, a clutch for connecting the quick traverse transmission with the driving member, a third clutch controlling operative connection of the table with the feed transmission, and shifting means common to all the clutches and comprising means to prevent simultaneous engagement of the quick traverse clutch and either of the other clutches.

41. In a machine tool the combination of a movable work table, a rotary tool spindle, a rotary driving member, a spindle transmission, a table feed transmission, a clutch for operatively connecting said transmissions with the driving member, a table quick traverse transmission, a clutch for connecting the quick traverse transmission with the driving member, a second clutch controlling operative connection of the table with the feed transmission, and shifting means common to all the clutches and comprising adjustable means for varying the relative time of engagement of the first two clutches.

42. In a machine tool the combination of a rotary driving member, a movable work table, a rotary tool spindle, a spindle transmission, a table feed transmission, a clutch for operatively connecting said transmissions with the driving member, a table quick traverse transmission, a clutch for connecting the quick traverse transmission with the driving member, a third clutch controlling operative connection of the table with the feed transmission, reversing mechanism common to both table transmissions, and shifting means common to all the clutches.

43. In a machine tool the combination of a movable work table, a rotary tool spindle, a rotary driving member, a spindle transmission, a table feed transmission, a clutch for operatively connecting said transmissions with the driving member, a table quick traverse transmission, a clutch for connecting the quick traverse transmission with the driving member, a third clutch controlling operative connection of the table with the feed transmission, a shiftable motion interrupting member common to both table transmissions, a controlling device for shifting said member, and shifting means common to all the clutches.

44. In a machine tool the combination of a movable work table, a rotary tool spindle, a rotary driving member, a spindle transmission, a table feed transmission, a clutch for operatively connecting said transmissions with the driving member, a table quick traverse transmission, a clutch for connecting the quick traverse transmission with the driving member, a third clutch controlling operative connection of the table with the quick traverse transmission, motion reversing and interrupting mechanism common to both table transmissions, and shifting means common to all the clutches.

45. In a machine tool the combination of a movable work table, a rotary tool spindle, a rotary driving member, a spindle transmission, a table feed transmission, a clutch for operatively connecting said transmissions with the driving member, a table quick traverse transmission, a clutch for connecting the quick traverse transmission with the driving member, a third clutch controlling operative connection of the table with the feed transmission, motion reversing and interrupting mechanism comprising a shiftable member common to both table transmissions, and a controlling device for shifting said member.

46. In a machine tool the combination of a movable work table, a rotary tool spindle, a rotary driving member, a spindle transmission, a table feed transmission, a clutch for operatively connecting said transmissions with the driving member, a table quick traverse transmission, a clutch for connecting the quick traverse transmission with the driving member, a third clutch controlling operative connection of the table with the feed transmission, and shifting means common to all the clutches and comprising means to disengage the third clutch whenever the quick traverse clutch is engaged.

47. In a machine tool the combination of a movable work table, a rotary tool spindle, a rotary driving member, a spindle transmission, a table feed transmission, a clutch for operatively connecting said transmissions with the driving member, a table quick traverse transmission, a clutch for connecting the quick traverse transmission with the driving member, a third clutch controlling operative connection of the table with the feed transmission, means tending to shift the third clutch into engagement, and means common to all the clutches and comprising means to disengage the third clutch whenever the quick traverse clutch is engaged.

48. In a machine tool the combination of a movable work table, a rotary tool spindle, a pump, a common driving member, a spindle transmission, a table feed transmission, a pump transmission, a clutch for operatively connecting said transmissions with the driving member, a table quick traverse transmission, a clutch for connecting the quick traverse transmission with the driving member, and shifting means common to both clutches and adapted to prevent engagement of the pump controlling clutch when the quick traverse controlling clutch is engaged, whereby the pump is operated only when the spindle transmission and table feed transmission are operatively connected with the driving member.

49. In a machine tool the combination of a movable work table, a table feed transmission, a pump, a pump transmission, a driving member, a clutch for operatively connecting said transmissions with the driving member, a table quick traverse transmission, a clutch for connecting the quick traverse transmission with the driving member, and shifting means common to both clutches and comprising means to prevent engagement of the pump controlling clutch when the quick traverse controlling clutch is engaged, whereby the pump is operatively connected with the driving member only when the table feed transmission is operatively connected therewith.

50. In a machine tool the combination of a movable work table, a rotary tool spindle, a driving member, a spindle transmission, a table feed transmission, a table quick traverse transmission, and a shiftable controlling member adapted when shifted in one direction to operatively connect the spindle transmission and table feed transmission with the driving member and when shifted in the other direction to operatively connect the table quick traverse connection with the driving member.

In witness whereof I hereto affix my signature.

FRED A. PARSONS.